United States Patent [19]

Klüber et al.

[11] Patent Number: 5,199,501
[45] Date of Patent: Apr. 6, 1993

[54] DRILLING OR CHISELING TOOL WITH SUCTION APPARATUS

[75] Inventors: Wilhelm Klüber, Königsbrunn, Fed. Rep. of Germany; Gebhard Gantner, Nenzing; Peter Brix, Penzberg, Fed. Rep. of Germany; Max Dietrich, Schaan, Liechtenstein

[73] Assignee: Hilti Aktiengesellschaft, Liechtenstein

[21] Appl. No.: 736,708

[22] Filed: Jul. 26, 1991

[30] Foreign Application Priority Data

Jul. 28, 1990 [DE] Fed. Rep. of Germany ....... 4024022

[51] Int. Cl.⁵ ........................................... B25D 17/14
[52] U.S. Cl. ..................................... 173/75; 173/171; 173/198; 408/58
[58] Field of Search ................. 173/197, 198, DIG. 2, 173/171, 75; 408/58; 175/209, 211; 15/347; 51/273

[56] References Cited

U.S. PATENT DOCUMENTS

| | | | |
|---|---|---|---|
| 4,192,390 | 3/1980 | Wanner et al. | 173/198 |
| 4,209,069 | 6/1980 | Smith | 408/67 |
| 4,921,375 | 5/1990 | Famulari | 173/75 |
| 5,090,499 | 2/1992 | Cuneo | 173/75 |

FOREIGN PATENT DOCUMENTS 3018197 11/1981 Fed. Rep. of Germany .

*Primary Examiner*—Douglas D. Watts
*Assistant Examiner*—Allan M. Schrock
*Attorney, Agent, or Firm*—Anderson Kill Olick & Oshinsky

[57] ABSTRACT

A drilling or chiseling tool (1) includes a suction device (2) with a suction head (3), a suction line (4) extending from the suction head to a suction blower wheel (5) and a separating device (6). The suction device (2) is detachably connected with the tool (1). When connecting the suction device (2) to the tool (1), the shaft (9) of the suction blower wheel (5) can be coupled with the drive shaft (8) of a drive motor (7) for the tool.

5 Claims, 2 Drawing Sheets

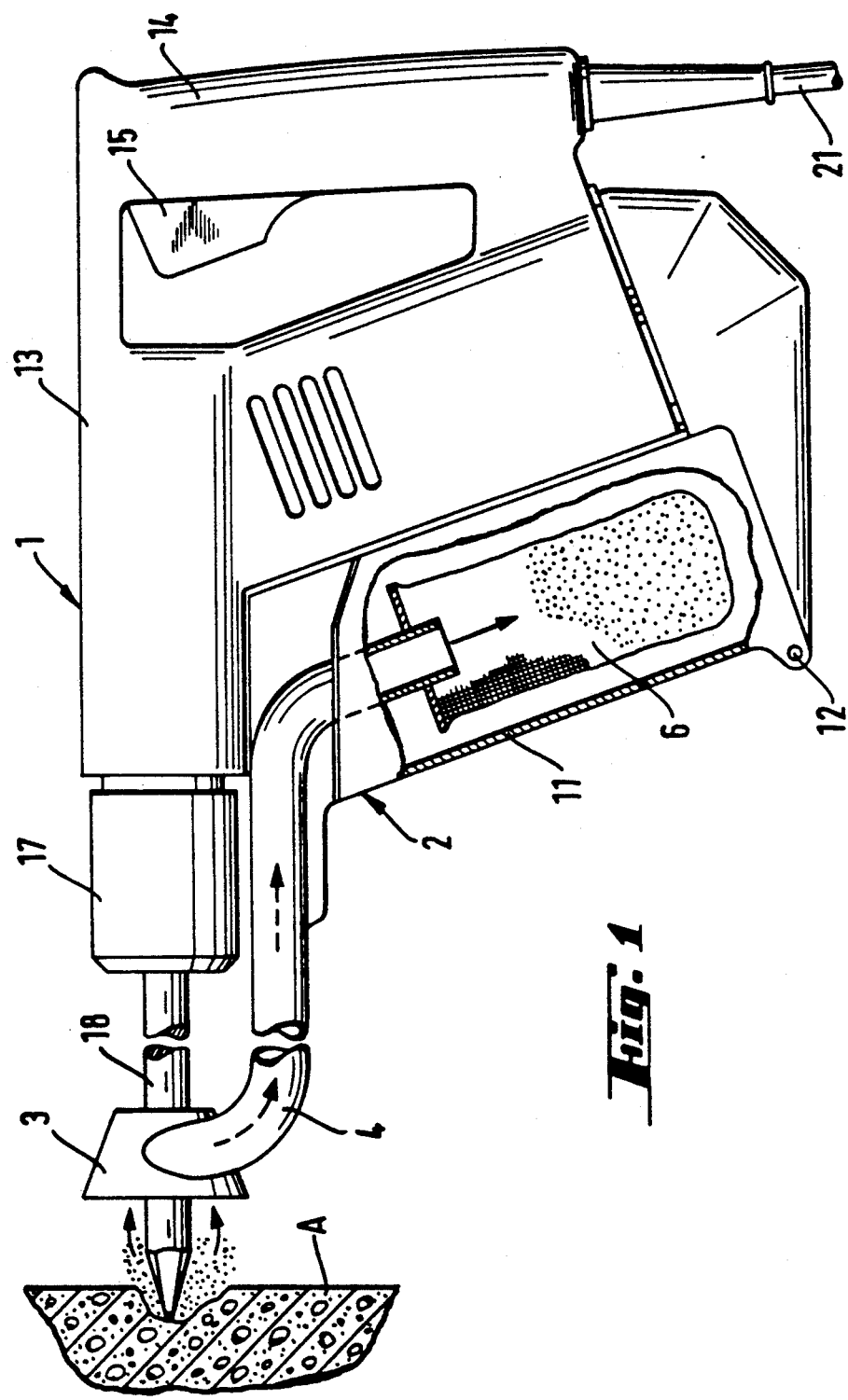

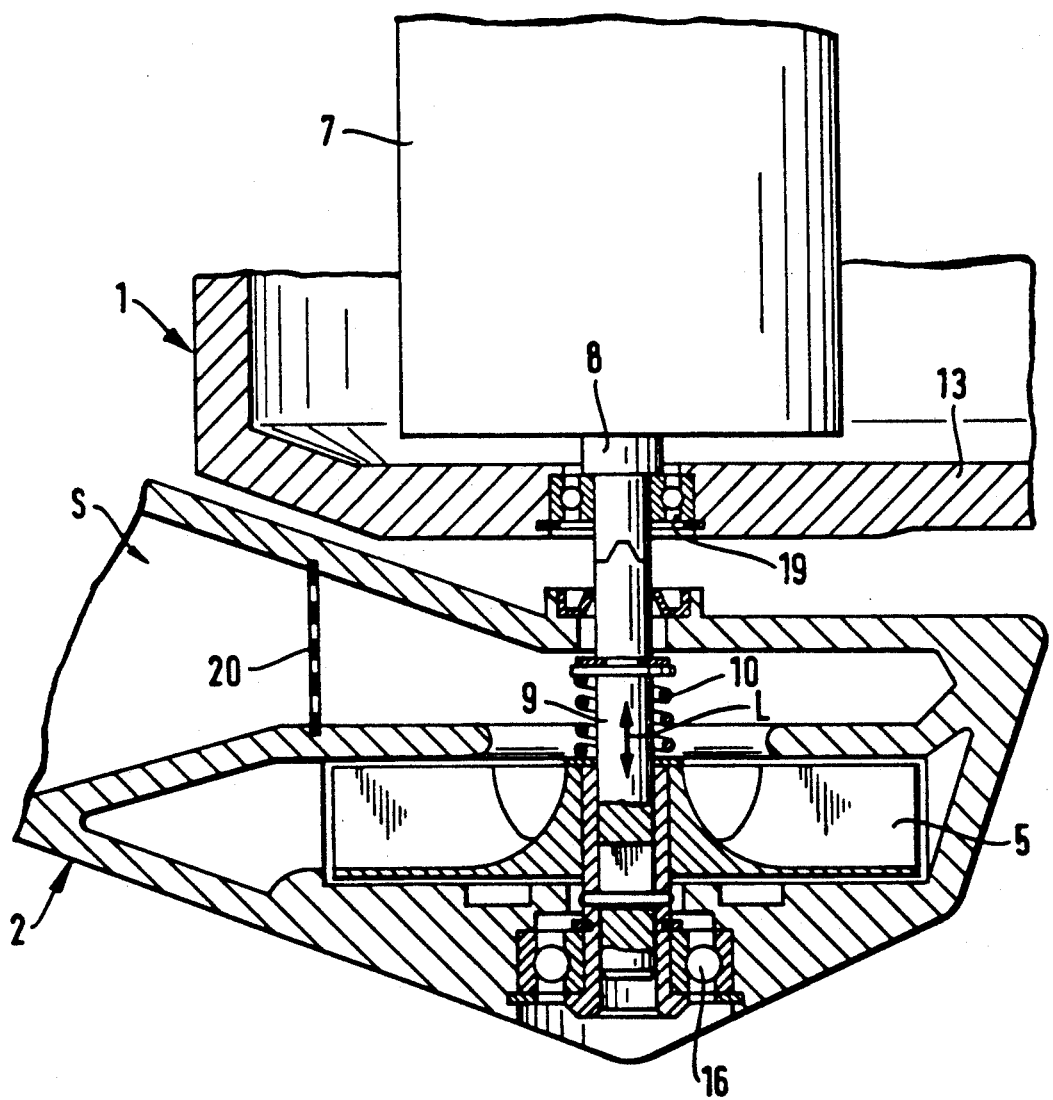

DRILLING OR CHISELING TOOL WITH SUCTION APPARATUS

BACKGROUND OF THE INVENTION

The present invention is directed to a manually operated drilling or chiseling tool with suction apparatus for removing drilled material. The suction apparatus includes a suction head, a suction line, a suction blower wheel and a separation device.

When drilling or cutting concrete, rock and the like, drilled material are produced which apart from dust, generate a considerable amount of dirt. In particular, when working in inhabited buildings or areas, such as in the food stuff and electronic industries, large dirt accumulations are not permissible.

Accordingly, the drilled material or drillings must be removed by suction. Suction equipment required for this purpose can be arranged externally of the drilling or chiseling tool or it can be provided as an integral component of the tool.

In an externally arranged suction device, usually the device has a mobile suction line separate and remote from the tool, so that it can be positioned in the region of the tool bit.

In DE-OS 27 05 358 a tool is shown with an integrated suction device. Such device includes a suction line leading to a suction blower which comprises a suction blower wheel mounted on the drive shaft of the motor for the tool with a separation device for the drillings positioned upstream from the suction blower wheel.

Certain of the parts of the suction device are quite large and are rigidly connected to the tool housing. The suction blower wheel is flanged directly to the drive shaft of the tool motor and is driven by the motor.

Such a tool has the disadvantage that the attached parts are not only heavy, but also render the tool cumbersome. Since all of the parts of the suction device form integrated components of the tool, the fabrication or procurement of the parts is quite expensive. Such a tool is not suited for normal drilling or chiseling operations, since the volumetric capacity of the separation device is very limited.

SUMMARY OF THE INVENTION

Therefore, the primary object of the present invention is to provide a manually operated drilling or chiseling tool capable of satisfactory withdrawal of drillings by suction and also to afford a tool with a high degree of flexibility and economic efficiency.

In accordance with the present invention, a suction device is detachably connected with the tool housing.

Accordingly, a drilling or chiseling tool with a variety of utilization possibilities is achieved, when considered in view of a described set of problems. It is possible to use the tool with the suction device if it is required, or without the suction device if conditions do not require the removal of the drillings. As a result, a user can buy a reasonably priced basic tool and, subsequently, the tool housing can be fitted with a suction device in the form of an accessory.

By designing the suction device as a structural component or modular unit of the tool it can be rapidly attached or detached with the suction blower wheel forming a part of the suction device.

The drive motor of the drilling or chiseling tool also serves to drive the suction blower wheel. Accordingly, the suction blower wheel can be coupled with the shaft of the drive motor. Independent of a step-up or step-down of the rpm of the drive motor, there is the basic advantage that an additional motor is not required for driving the suction blower wheel. As a result, the fabrication of the suction device is more economical and reduces the weight of the entire tool.

A suction blower wheel having a shaft which can be coupled with the drive motor of the tool is a preferred embodiment. Force transmittal can take place in different ways. Basically, rotation transmitting elements, such as belts, chains or gear boxes can be used.

To achieve an optimum and direct transmission ratio of the suction blower wheel with the drive motor, it is preferable to arrange the suction blower wheel shaft and the drive motor shaft coaxial with one another. Therefore, the shafts can be coupled to one another by a plug-in or a magnetic coupling or clutch. With a coaxial arrangement of the suction blower wheel and drive motor shafts, the shafts will always rotate at the same speed.

In a preferred arrangement, the suction blower wheel shaft is axially displaceable. When affixing the suction device to the drilling or chiseling tool, a coupling of the two shafts must be achieved. For this purpose, cooperating projections and depressions at the end faces of the shafts can act as a coupling, so that the shafts can be connected together in a positive locking manner by axial displacement of the suction blower wheel shaft.

It is advantageous to provide a driving or force generating member, to avoid a manual operation in the axial displacement of the drive shaft of the suction blower wheel in the shaft coupling operation. The axial displacement can be provided in the form of a magnetic arrangement, a spring element, or by an air cushion produced by the tool itself. If, when coupling the suction device to the tool, the parts of the coupled elements are not properly positioned with respect to one another, the shaft of the suction blower wheel is displaced away from the shaft of the drive motor in the axial direction against the force of a spring. An automatic positively locked connection of the two shafts takes place when the tool is switched on.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side elevational view, partly cut away, of a drilling or chiseling tool with an attached suction device embodying the present invention; and FIG. 2 is an enlarged partial sectional view of the tool illustrated in FIG. 1 taken in the region of the suction blower wheel.

DETAILED DESCRIPTION OF THE INVENTION

In FIG. 1, a manually operated drilling or chiseling tool 1 is shown. The tool 1 comprises a housing 13 having a leading or working end at the left end and a trailing end at the right end. A tool handle 14 is located at the trailing end of the housing. A trigger-like switch 15 is located in the tool handle 14 for operating the drilling or chiseling tool 1. At the lower end of the handle 14, as viewed in FIG. 1, an electric power cable 21 passes through an elastic bush into the handle. A drill chuck 17 is located at the leading end of the housing and the chuck serves to receive and hold a drilling or chiseling tool bit 18.

A suction device 2 for collecting the drillings or drilled material is formed of a suction head 3 located along the tool bit 18 close to the leading end of the tool. A suction line 4 is connected at one end to the suction head 3 and at its other end to a separating device 6. A suction blower wheel 5, note FIG. 2, provides the suctioning action. Suction head 3 is located in the region where the tool bit 18 works on the receiving material A. For the most part, suction line 4 runs parallel to the axial direction of the tool bit 18 and then turns generally vertically downward, as shown in FIG. 1, into the separation device 6.

The drillings removed from the receiving material A by the tool bit 18 are withdrawn by the suction device 2. The suction blower wheel is located downstream of the separating device 6 and produces an air flow which removes the drillings at a high velocity from the working point of the tool bit 18. The drillings flow through the suction head and the suction line 4 into the separating device 6.

Separating device 6 can be a sintered plastics filter with bellows-like walls, which is rigid and can not be compressed or expanded. The bellows-like walls provide an enlarged filtering area. The enveloping walls of the plastic filter can be round or multi-cornered.

In another embodiment the separating device 6 can be a paper backed filter lined with Teflon. The Teflon lining is deposited on the surface in contact with the drillings. Because of this lining or coating, dust does not stick to the filter wall, rather it falls to the bottom of the paper bag. As a result, a uniform filter output is obtained.

Still another embodiment of the separating device 6 is a fabric filter formed from a textile material or a completely conventional paper backed filter comprised of several layers of paper and fleece arranged between the layers.

The separating device 6 is located in a space especially provided for it in the suction device 2. This space is accessible through a lid or door 11 pivotally mounted by a hinge 12 so that it can be moved into a open position.

In FIG. 2 an electric motor 7 of the tool is positioned in a lower region of the housing 13. Electric motor 7 has a drive shaft 8 extending downwardly from the motor 7.

Drive shaft 8 of the motor 7 projects downwardly from the bottom of the housing 13. A shaft 9 for the suction blower wheel 5 extends upwardly and is arranged coaxially with the shaft 8 of the drive motor 7.

Suction blower wheel 5 is supported on its lower side by a deep groove ball bearing 16 and on its upper side above the connection with the drive shaft 8 by means of bearing support points 19 for the drive motor 7.

The coupled arrangement shown in FIG. 2 consists of a slot-shaped recess in the end face of the shaft 8 for the drive motor into which a blade shaped projection on the end of the shaft 9 of the suction blower wheel engages. In another embodiment, the coupling comprises toothed end faces on both of the shafts 8, 9 with a lug-like projection, in particularly a cylindrical projection, for guiding the lug-like projection into a corresponding bore for coupling the two shafts 8, 9. The shaft 9 of the suction blower wheel 5 is axially displaceable in the direction of the double headed arrow L.

The suction device 2 is formed as a component or modular unit detachably connectible with the drilling or chiseling tool 1. It is possible during the attachment of the suction device 2, that the coupling parts in the end faces of the shaft 8 and shaft 9 are not aligned for interengagement. Accordingly, the shaft 9 of the suction blower wheel 5 is displaceable in the axial direction against a spring 10. After the tool is switched on, the coupling parts can align with one another, so that the shaft 9 moves in the direction of the drive shaft 8, for effecting a positively locked connection.

In FIG. 2, a screen 20, such as a metal plate with relatively large openings, is located in the flow channel S between separating device 6 and the suction blower wheel 5. When withdrawing the drillings by suction, it is quite possible that relatively large sharp-pointed or sharp-edged parts are removed and may damage the suction device 2 when such larger parts of the drillings lodge between the vanes of the suction blower wheel 5. If such materials become lodged, there is the possibility that the suction blower wheel 5 may become jammed resulting in damage to the wheel and to the coupling.

To counter such a situation, the axial displaceability of the shaft 9 of the suction blower wheel 5 is used so that the coupling functions as a torque limiting device. If the suction blower wheel 5 can not continue to rotate for whatever reason, the interfitting concave or convex parts of the shafts 8, 9 are shaped so that they move axially away from one another, if excessive torque develops, with the positively locked connection becoming disengaged. Such an arrangement assures that no damage can occur in the drilling or chiseling tool, if the suction blower wheel should become seized.

While specific embodiments of the invention have been shown and described in detail to illustrate the application of the inventive principles, it will be understood that the invention may be embodied otherwise without departing from such principles.

We claim:

1. Manually operated drilling or chiseling tool (1) comprising a tool housing (13) having a leading or working end arranged to receive a working tool bit (18) and a trailing end, a suction device (2) for removing drillings or drilled material from the working end including a suction head (3) located adjacent the working tool bit (18), a suction line (4) connected to said suction head (3) for removing the drilled material therefrom, a suction blower wheel (5) for applying a suction to the suction head (3), and a separating device (6) connected to said suction line (4) at a position spaced from said suction head (3) and arranged to separate out the drilled material, wherein the improvement comprises that said suction device (2) is detachably connected to said tool housing 13, said suction device (2) is formed as a detachable modular unit of said tool, said tool (1) has a drive motor (7), said suction blower wheel (5) of said suction drive (2) can be releasably coupled with the drive motor (7) of the tool (1), and said suction blower wheel (5) comprises a shaft (9) for driving the wheel, said drive motor (7) has a drive shaft (8) releasably coupled with said blower wheel shaft (9) for transmitting rotational movement directly from said drive shaft to said blower wheel shaft. and a force biasing element biases the flower wheel shaft against the drive motor shaft.

2. Manually operated drilling or chiseling tool, as set forth in claim 1, wherein said blower wheel shaft and said drive motor shaft are arranged coaxial with one another.

3. Manually operated drilling or chiseling tool, as set forth in claim 2, wherein said blower wheel shaft (9) is axially displaceable.

4. Manually operated drilling or chiseling tool comprising a tool housing (13) having a leading or working end arranged to receive a working tool bit (18) and a trailing end, a suction device (2) for removing drillings or drilled material from the working end including a suction head (3) located adjacent the working tool bit (18), a suction line (4) connected to said suction head (3) for removing the drilled material therefrom, a suction blower wheel (5) for applying a suction to the suction head (3), and a separating device (6) connected to said suction line (4) at a position spaced from said suction head (3) and arranged to separate out the drilled material, wherein the improvement comprises that said suction device (2) is detachably connected to said tool housing 13, said suction device (2) is formed as a detachable modular unit of said tool, said tool (1) has a drive motor (7), said suction blower wheel (5) of said suction drive (2) can be releasably coupled with the drive motor (7) of the tool (1), and said suction blower wheel (5) comprises a shaft (9) for driving the wheel, said drive motor (7) has a drive shaft (8) releasably coupled with said blower wheel shaft (9), said blower wheel and drive motor shaft are arranged coaxially with one another, said blower wheel shaft (9) is axially displaceable, and a force biasing element (10) biases the blower wheel shaft (9) against the drive motor shaft (8).

5. Manually operated drilling or chiseling tool, as set forth in claim 4, wherein said force biasing element (10) is a spring (10).

* * * * *